United States Patent
Matsumoto et al.

(10) Patent No.: US 9,605,176 B2
(45) Date of Patent: Mar. 28, 2017

(54) ACRYLIC RESIN EMULSION FOR AQUEOUS INKJET INK, AND AQUEOUS INKJET INK COMPOSITION EMPLOYING THE SAME

(71) Applicant: THE NIPPON SYNTHETIC CHEMICAL INDUSTRY CO., LTD., Osaka (JP)

(72) Inventors: Akihisa Matsumoto, Osaka (JP); Toshimitsu Inoue, Osaka (JP); Taiji Kanda, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/652,867

(22) PCT Filed: Dec. 27, 2013

(86) PCT No.: PCT/JP2013/085164
§ 371 (c)(1),
(2) Date: Jun. 17, 2015

(87) PCT Pub. No.: WO2014/104319
PCT Pub. Date: Jul. 3, 2014

(65) Prior Publication Data
US 2015/0322282 A1 Nov. 12, 2015

(30) Foreign Application Priority Data
Dec. 27, 2012 (JP) .................................. 2012-283870

(51) Int. Cl.
| | |
|---|---|
| *C09D 11/107* | (2014.01) |
| *C09D 11/322* | (2014.01) |
| *C09D 133/12* | (2006.01) |
| *C09D 11/34* | (2014.01) |
| *C09D 11/38* | (2014.01) |

(52) U.S. Cl.
CPC .......... *C09D 133/12* (2013.01); *C09D 11/107* (2013.01); *C09D 11/322* (2013.01); *C09D 11/34* (2013.01); *C09D 11/38* (2013.01)

(58) Field of Classification Search
USPC ....................................................... 523/160
See application file for complete search history.

(56) References Cited

U.S. PATENT DOCUMENTS

| | | | |
|---|---|---|---|
| 6,646,058 B1 * | 11/2003 | Koger ................ | C08F 290/062 524/430 |
| 2005/0282930 A1 | 12/2005 | Fu et al. | |
| 2009/0041942 A1 | 2/2009 | Hayashi et al. | |
| 2012/0050384 A1 | 3/2012 | Nishiguchi et al. | |

FOREIGN PATENT DOCUMENTS

| | | |
|---|---|---|
| CN | 101273103 A | 9/2008 |
| EP | 2423272 A2 | 2/2012 |
| EP | 2423273 A1 | 2/2012 |
| JP | 2006-22328 A | 1/2006 |
| JP | 2008-195769 A | 8/2008 |
| JP | 2011-012173 A | 1/2011 |
| JP | 2011-202030 A | 10/2011 |
| JP | 2012-72357 A | 4/2012 |

OTHER PUBLICATIONS

Machine translation of JP 2011-012173 A to Hayashi et al.*
International Search Report from PCT/JP2013/085164, mail date is Apr. 1, 2014.
International preliminary report on patentability from PCT/JP2013/085164, mail date is Jun. 30, 2015.
European Search Report issued with respect to application No. 13867739.8, mail date is Jul. 29, 2016.
"Research of Mechanism of Thickening Acrylate Emulsion", China Academic Journal Electronic Publishing House, pp. 21-24, 2005, with partial English translation of Chinese Office Action (listed below on this IDS form) submitted as a concise explanation of the relevance.
Chinese Office Action issued with respect to application No. 201380067969.4, mail date is Mar. 24, 2016 (partial translation provided as a concise explanation of the relevance of "Research of Mechanism of Thickening . . . " listed above on this IDS form).

* cited by examiner

*Primary Examiner* — Vu A Nguyen
(74) *Attorney, Agent, or Firm* — Greenblum & Bernstein, P.L.C.

(57) ABSTRACT

To provide an aqueous inkjet ink composition excellent in glossiness and other ink properties and imparted with a higher viscosity without the use of a tackifier, an acrylic resin emulsion for an aqueous inkjet ink is provided, which contains a particulate acrylic resin having an acid value of 1 to 100 mgKOH/g, wherein an acid-group-containing monomer is present at a content mole ratio (As) in surface regions of particles of the particulate acrylic resin and present at a content mole ratio (At) in the overall acrylic resin particles as measured with a $^1$H spin diffusion time of 5 ms, and a ratio (As/At) of the content mole ratio (As) to the content mole ratio (At) is not less than 9.

5 Claims, 1 Drawing Sheet

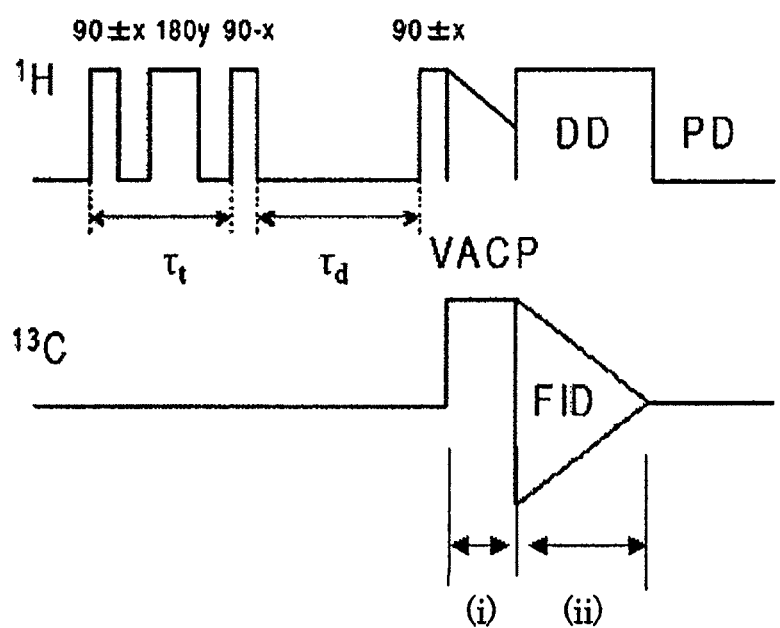

ACRYLIC RESIN EMULSION FOR AQUEOUS INKJET INK, AND AQUEOUS INKJET INK COMPOSITION EMPLOYING THE SAME

TECHNICAL FIELD

The present invention relates to an acrylic resin emulsion which is advantageously used for an aqueous inkjet ink.

BACKGROUND ART

In an inkjet recording method, an aqueous ink composition is jetted in a liquid droplet form onto a substrate from small holes based on electric signals which induce thermal or mechanical pulses. In response to the pulses, the ink is jetted in the form of liquid droplets, which are forced toward specific positions on a surface of the substrate. After once being applied to the surface, the liquid droplets are required to stay at the positions and maintain their dimensions to form an image with a proper resolution. Thereafter, the liquid droplets are dried and sufficiently fixed to the surface of the substrate.

With the recent innovative progress of the inkjet recording technique, the inkjet recording method is employed for higher-definition image recording (image printing) which used to be an application filed of photography and offset printing. Inkjet printers including a higher-viscosity ink head have been developed, which permit formation of clearer images with the use of a higher-viscosity ink. Hence, there is a demand for the higher-viscosity ink to be used with the higher-viscosity ink head.

An ink composition (PLT1) which contains an aqueous vehicle, a self-dispersive pigment, a silicone-containing surfactant and a polymer having a specific glass transition temperature (Tg), and an ink composition (PLT2) which contains at least a polymer, glycerin, a tackifier and water, for example, have been developed as aqueous inkjet ink compositions to be used for inkjet inks. In PLT2, a method of controlling the viscosity of the ink with the use of the tackifier is disclosed.

RELATED ART DOCUMENTS

Patent Documents

PLT1: JP-A-2006-22328
PLT2: JP-A-2011-202030

SUMMARY

Technical Problem

However, the aqueous inkjet ink composition employing a resin emulsion as described in PLT1 generally has a lower viscosity and, therefore, cannot be applied to the higher-viscosity ink head as it is.

It is also conceivable to increase the viscosity of the ink with the use of the tackifier as described in PLT2, for example, in order to apply the ink to the higher-viscosity ink head. The aqueous inkjet ink composition imparted with a higher viscosity with the use of the tackifier can be used for the higher-viscosity ink head, but problematically has a lower glossiness after the printing.

In view of the foregoing, the present invention provides an acrylic resin emulsion to be used for an aqueous inkjet ink composition excellent in glossiness and other ink properties and imparted with a higher viscosity without the use of a tackifier.

In view of the foregoing, inventors of the present invention conducted intensive studies. As a result, the inventors found that, if an emulsion to be used for an aqueous inkjet ink composition contains a particulate acrylic resin and an acid-group-containing monomer is present at a higher content ratio in surface regions of particles of the particulate acrylic resin, the aqueous inkjet ink composition has a higher viscosity and yet has an excellent glossiness.

According to the present invention, an acrylic resin emulsion for an aqueous inkjet ink is provided, which contains a particulate acrylic resin having an acid value of 1 to 100 mgKOH/g, wherein an acid-group-containing monomer is present at a content mole ratio (As) in surface regions of particles of the particulate acrylic resin and present at a content mole ratio (At) in the overall acrylic resin particles as measured with a $^1$H spin diffusion time of 5 ms, and a ratio (As/At) of the content mole ratio (As) to the content mole ratio (At) is not less than 9.

According to the present invention, an aqueous inkjet ink composition is also provided, which contains the acrylic resin emulsion for the aqueous inkjet ink, a pigment, a solvent and a wetting agent.

The aqueous inkjet ink composition employing the inventive acrylic resin emulsion for the aqueous inkjet ink has a higher viscosity and, therefore, can be used for a higher-viscosity ink head. Further, the aqueous inkjet ink composition is excellent in glossiness and other ink properties in good balance and, therefore, can be used for high-definition image recording.

BRIEF DESCRIPTION OF DRAWING

The FIGURE is a diagram for explaining an (As) measuring method employing NMR spectra as described in Polymer Preprints Japan Vol. 60, No. 2, 3086(2011).

DESCRIPTION OF EMBODIMENTS

The present invention will hereinafter be described in detail.

In the present invention, the term "(meth)acryl" means acryl or methacryl, and the term "(meth)acryloyl" means acryloyl or methacryloyl. The term "(meth)acrylate" means acrylate or methacrylate.

The inventive acrylic resin emulsion is an acrylic resin emulsion for an aqueous inkjet ink, and contains a particulate acrylic resin having an acid value of 1 to 100 mgKOH/g. An acid-group-containing monomer is present at a content mole ratio (As) in surface regions of particles of the particulate acrylic resin and present at a content mole ratio (At) in the overall acrylic resin particles as measured with a $^1$H spin diffusion time of 5 ms, and the ratio (As/At) of the content mole ratio (As) to the content mole ratio (At) is not less than 9.

First, the acrylic resin to be contained in the inventive acrylic resin emulsion for the aqueous inkjet ink will be described.

<Acrylic Resin>

The acrylic resin is required to have an acid value of 1 to 100 mgKOH/g, preferably 1 to 50 mgKOH/g, particularly preferably 1 to 30 mgKOH/g.

If the acid value is excessively high, an ink coating film formed by using the emulsion containing the acrylic resin is liable to have a reduced water resistance. If the acid value is excessively low, the particulate acrylic resin tends to be less stable.

The acid value may be controlled within the aforementioned range by controlling the blending amount of the acid-group-containing monomer to be described later.

The ratio (As/At) of the content mole ratio (As) of the acid-group-containing monomer in the surface regions of the acrylic resin particles to the content mole ratio (At) of the acid-group-containing monomer in the overall acrylic resin particles is required to be not less than 9 as measured with a $^1$H spin diffusion time of 5 ms. The ratio (As/At) is preferably 10 to 100, particularly preferably 11 to 80, more preferably 12 to 60, further more preferably 13 to 40.

If the As/At ratio is excessively low, the aqueous inkjet ink composition employing the resulting acrylic resin emulsion for the aqueous inkjet ink is liable to have a reduced viscosity.

The content mole ratio (As) of the acid-group-containing monomer in the surface regions of the acrylic resin particles is preferably 1 to 100, particularly preferably 2 to 80, more preferably 10 to 60, as measured with a $^1$H spin diffusion time of 5 ms.

If the value (As) is excessively great, an ink coating film formed by using the emulsion containing the acrylic resin particles is liable to have a reduced water resistance. If the value (As) is excessively low, the particulate acrylic resin tends to be less stable.

The content mole ratio (At) of the acid-group-containing monomer in the overall acrylic resin particles is preferably 0.1 to 11, particularly preferably 0.5 to 8, more preferably 1 to 5.

If the value (At) is excessively great, an ink coating film formed by using the emulsion containing the acrylic resin particles is liable to have a reduced water resistance. If the value (At) is excessively low, the particulate acrylic resin tends to be less stable.

Examples of the acid-group-containing monomer include carboxyl-group-containing monomers, sulfonic-acid-group-containing monomers and phosphoric-acid-group-containing monomers, among which the carboxyl-group-containing monomers are preferred because the viscosity increasing effect can be easily provided.

The content ratio (As) of the acid-group-containing monomer in the surface regions of the particles and the content ratio (At) of the acid-group-containing monomer in the overall particles can be calculated by analyzing NMR spectra.

Where the acid group is a carboxyl group, for example, a resonance peak for the carboxyl group in the carboxyl-group-containing monomer appears at 190 to 180 ppm in a $^{13}$C spectrum. On the other hand, a resonance peak for the carbonyl group in the ester structure of the acrylate monomer appears at 180 to 170 ppm in the $^{13}$C spectrum. The formulation of the copolymer can be determined based on the area ratio of these two resonance peaks.

As described above, the content ratio (As) is a content ratio of the acid-group-containing monomer in the surface regions of the acrylic resin particles as measured with an NMR $^1$H spin diffusion time of 5 ms. The surface regions of the acrylic resin particles to be subjected to the measurement, i.e., the depths of the surface regions as measured from the surfaces of the particles, are an important factor. The specific depths of the surface regions of the acrylic resin particles can be calculated from the following mathematical expression (MATH-1):

$$L = 0.816 \times (\tau d)^{1/2} \quad \text{(MATH-1)}$$

wherein L is the depth (nm) of the surface region of an acrylic resin particle as measured from the surface of the particle, 0.816 is a coefficient, and $\tau d$ (ms) is the $^1$H spin diffusion time (Reference: Masuda et al., Solid State Nuclear Magnetic Resonance (2003) 23, 198).

That is, where the NMR $^1$H spin diffusion time for the content ratio (As) is 5 ms in the mathematical expression (MATH-1), the depth from the surface of the acrylic resin particle is about 1.8 nm. That is, the content ratio (As) is the content mole ratio of the acid-group-containing monomer in a surface region having a depth of about 1.8 nm as measured from the surface of the acrylic resin particle.

On the other hand, the content ratio (At) is the content mole ratio of the acid-group-containing monomer in the overall acrylic resin particles, and can be determined by analyzing the NMR spectrum as described above.

The NMR spectra are typically determined through measurement by a common NMR spectrometer, e.g., an NMR spectrometer (AVANCE III 400WB available from Bruker Corporation). The content ratio (As) can be determined by the method described in Polymer Preprints Japan Vol. 60, No. 2, 3086 (2011) shown in the FIGURE, and the content ratio (At) can be determined with the use of CP/MAS (Cross Polarization Magic Angle Spinning).

Symbols shown in the FIGURE are as follows:
It is herein assumed that a magnetic field is generated along the z-axis.

90±x: A pulse is rotatively phase-shifted by 90 degrees alternately toward +x and −x axial directions.

90−x: A pulse is rotatively phase-shifted by 90 degrees toward the −x axial direction.

180y: A pulse is rotatively shifted by 180 degrees about the y-axis.

τt: Time required for demagnetization of a solid component.

τd: $^1$H spin diffusion time.

VACP: Cross polarization (Variable Amplitude Magic Angle Spinning) component.

(i): Contact time (Period during which cross polarization is effected).

DD: Decoupling (Dipole Decoupling).

PD: Standby period for next pulse (Post Delay).

FID: Free Induction Decay.

(ii): Period during which FID signals are fetched.

An NMR spectrum measuring method will hereinafter be described specifically.

<NMR Spectrum Measuring Method>

NMR spectra (for the content ratios (As) and (At)) are measured at a temperature of 20° C. by means of an NMR spectrometer (AVANCE III 400WB available from Bruker Corporation) with the use of a 4-mm diameter solid CP/MAS probe and a 4-mm HRMAS test tube under measurement conditions shown below in Table 1.

TABLE 1

| | (As) measuring conditions | (At) measuring conditions |
|---|---|---|
| Revolutions of test tube | 10000 Hz | |
| Major measurement parameters | | |
| $^1$H 90° pulse | 4 μs × 3 dB (39 W/300 W) | |
| Contact time (corresponding to (i) in the FIGURE) | 1000 μs (Highly quantitative conditions are selected for contact time) | |

TABLE 1-continued

|  | (As) measuring conditions | (At) measuring conditions |
|---|---|---|
| Time required for demagnetization of solid component (corresponding to τt in the FIGURE) | 1 ms | — |
| ¹H spin diffusion time (corresponding to τd in the FIGURE) | 5 ms | — |
| FID signal fetch time (corresponding to (ii) in the FIGURE) | 14 ms | 14 ms |
| Number of times of multiplication | >8000 | >256 |
| Observation center |  | 120 ppm |
| Observation width |  | 365 ppm |

The particulate acrylic resin preferably has an average particle diameter of 40 to 300 nm, particularly preferably 50 to 200 nm, more preferably 60 to 150 nm.

If the average particle diameter is excessively great, the resulting coating film tends to have poorer glossiness. If the average particle diameter is excessively small, a greater amount of an emulsifier is required in the production, resulting in inefficient economy.

The average particle diameter is a volume average particle diameter which is determined through cumulant fitting of an autocorrelation function obtained at a temperature of 23° C. with a scatter angle of 90 degrees by a dynamic light scattering method (DLS). "NICOMP 380" available from Particle Sizing Systems Inc. may be used as a measuring apparatus.

The surface region of the acrylic resin particle accounts for about 3 to about 25 vol % based on the volume of the entire particle.

The acrylic resin having the aforementioned properties may be prepared by a single-stage polymerization method or by a two or more stage polymerization method. The two or more stage polymerization method is more preferred, because the localization of the acid-group-containing monomer in the surface regions of the particles can be promoted by increasing the blending proportion of the acid-group-containing monomer at a latter polymerization stage.

In the case of the single-stage polymerization method, the content ratio of an essentially water-soluble acid-group-containing monomer for the particulate acrylic resin having an acid value of 1 to 100 mgKOH/g is increased to promote the localization of the monomer in the surface regions of the particles, whereby the emulsion containing the acrylic resin particles can be prepared as desired by the polymerization.

In the case of the two-stage polymerization method (where n is 2), for example, a first emulsion is prepared through emulsion polymerization of a first-stage monomer component, and then a second-stage monomer component containing the acid-group-containing monomer in a greater proportion is added to the first emulsion to be thereby polymerized in the first emulsion through emulsion polymerization.

The number n of times of the polymerization is an integer of not less than 2, preferably 2 to 3, particular preferably 2. If the number n is excessively great, the viscosity increasing effect tends to be reduced.

In the polymerization of the acrylic resin, the monomer components in the respective polymerization stages preferably satisfy the following weight ratios (α) and (β):

(α) the weight ratio (1a)/(2a) between an acid-group-containing monomer (1a) to be used in the first to (n−1)th polymerization stages and an acid-group-containing monomer (2a) to be used in the n-th polymerization stage is 0/100 to 40/60; and (β) the weight ratio (X1)/(X2) between the total weight (X1) of monomers to be used in the first to (n−1)th polymerization stages and the total weight (X2) of monomers to be used in the n-th polymerization stage is 99/1 to 60/40.

The weight ratio (α)=(1a)/(2a) between the acid-group-containing monomer (1a) to be used in the first to (n−1)th polymerization stages and the acid-group-containing monomer (2a) to be used in the n-th polymerization stage is preferably (1a)/(2a)=0/100 to 40/60, more preferably (1a)/(2a)=0.5/99.5 to 20/80, particularly preferably (1a)/(2a)=1/99 to 10/90.

If the use amount of the acid-group-containing monomer (2a) is excessively smaller than the use amount of the acid-group-containing monomer (1a), it will be impossible to sufficiently increase the viscosity of the inkjet ink composition.

The weight ratio (β)=(X1)/(X2) between the total weight (X1) of the monomers to be used in the first to (n−1)th polymerization stages and the total weight (X2) of the monomers to be used in the n-th polymerization stage is preferably (X1)/(X2)=99/1 to 60/40, more preferably (X1)/(X2)=99/1 to 80/20, particularly preferably (X1)/(X2)=98/2 to 90/10.

If the weight (X2) is excessively greater than the weight (X1), the viscosity of the acrylic resin tends to be excessively high. If the weight (X2) is excessively smaller than the weight (X1), it will be impossible to sufficiently increase the viscosity of the inkjet ink composition.

The production of the acrylic resin by the two-stage polymerization method (n=2) will hereinafter be described in detail.

In the first polymerization stage, a monomer component (I) including the acid-group-containing monomer (1a) and a (meth)acrylate monomer (1b) as a major component thereof is polymerized.

The term "major component" herein means a component which is contained in an amount of 50% or more and may be contained alone.

Examples of the acid-group-containing monomer (1a) include carboxyl-group-containing monomers, sulfonic-acid-group-containing monomers and phosphoric-acid-group-containing monomers, among which the carboxyl-group-containing monomers are preferred because the viscosity increasing effect can be easily provided.

Examples of the carboxyl-group-containing monomers include (meth)acrylic acid, an acrylic acid dimer, crotonic acid, maleic acid, maleic anhydride, fumaric acid, citraconic acid, glutaconic acid, itaconic acid, acrylamide-N-glycolic acid and cinnamic acid, among which (meth)acrylic acid is preferred, and methacrylic acid is particularly preferred for stability of the resulting inkjet ink composition.

Examples of the sulfonic-acid-group-containing monomers include vinyl sulfonate, 2-acrylamido-2-methylpropanesulfonic acid, styrene sulfonic acid, allyl sulfonate, 3-sulfopropyl (meth)acrylate, and bis-(3-sulfopropyl) itaconate.

Examples of the phosphoric-acid-containing monomers include vinyl phosphonate and the like.

For excellent physical properties (ethanol resistance and water resistance) of the ink coating film to be formed from the aqueous inkjet ink composition, it is preferred not to use the acid-group-containing monomer (1a). Where the acid-group-containing monomer (1a) is used, however, the acid-group-containing monomer (1a) is preferably contained in the monomer component (I) in a proportion of 0.1 to 20 wt %, particularly preferably 0.5 to 10 wt %, more preferably 1 to 5 wt %.

If the proportion of the acid-group-containing monomer is excessively great, an ink coating film formed from the resulting aqueous inkjet ink composition tends to be poorer in physical properties (ethanol resistance and water resistance).

Examples of the (meth)acrylate monomers (1b) include alkyl (meth)acrylates such as methyl (meth)acrylate, ethyl (meth)acrylate, n-butyl (meth)acrylate, iso-butyl (meth)acrylate, tert-butyl (meth)acrylate, n-propyl (meth)acrylate, n-hexyl (meth)acrylate, 2-ethylhexyl (meth)acrylate, n-octyl (meth)acrylate, iso-octyl (meth)acrylate, isodecyl (meth)acrylate, lauryl (meth)acrylate, cetyl (meth)acrylate, stearyl (meth)acrylate and iso-stearyl (meth)acrylate; and alicyclic (meth)acrylates such as cyclohexyl (meth)acrylate and isobonyl (meth)acrylate. Where the (meth)acrylate monomer (1b) is an alkyl (meth)acrylate, the alkyl group typically has 1 to 20 carbon atoms, particularly preferably 1 to 12 carbon atoms, more preferably 1 to 8 carbon atoms. These (meth)acrylate monomers may be used either alone or in combination.

Among these (meth)acrylate monomers (1b), methyl methacrylate and n-butyl acrylate are preferred, and methyl methacrylate is particularly preferred, because an ink coating film formed from the resulting aqueous inkjet ink composition is excellent in physical properties (ethanol resistance and water resistance).

In the monomer component (I), the (meth)acrylate monomer (1b) is preferably contained in a proportion of 80 to 100 wt %, particularly preferably 90 to 99.9 wt %, more preferably 95 to 99.5 wt %. If the proportion of the (meth)acrylate monomer (1b) is excessively small, an ink coating film formed from the resulting aqueous inkjet ink composition tends to be poorer in physical properties (ethanol resistance and water resistance).

In the present invention, as required, an additional monomer (1c) may be copolymerized with the acid-group-containing monomer (1a) and the (meth)acrylate monomer (1b), and examples of the monomer (1c) include the following monomers (a) to (h):
(a) a hydroxyl-group-containing ethylenically unsaturated monomer;
(b) an epoxy-group-containing ethylenically unsaturated monomer;
(c) a methylol-group-containing ethylenically unsaturated monomer;
(d) an alkoxyalkyl-group-containing ethylenically unsaturated monomer;
(e) a cyano-group-containing ethylenically unsaturated monomer;
(f) an ethylenically unsaturated monomer having two or more radically polymerizable double bonds;
(g) an amino-group-containing ethylenically unsaturated monomer; and
(h) an aromatic-ring-containing ethylenically unsaturated monomer.

Other than the monomers (a) to (h), as required, monomers such as vinyl propionate, vinyl versatate, vinylpyrrolidone, methyl vinyl ketone, butadiene, ethylene, propylene, vinyl chloride and vinylidene chloride may be used for the acrylic resin in the present invention.

Examples of the hydroxyl-group-containing ethylenically unsaturated monomer (a) include hydroxyalkyl (meth)acrylates such as hydroxyethyl (meth)acrylate and hydroxypropyl(meth)acrylate, and polyalkylene glycol (meth)acrylates such as polyethylene glycol (meth)acrylate, which may be used either alone or in combination. Among these monomers, hydroxyalkyl (meth)acrylates having a C2 to C4 hydroxyalkyl group and polyalkylene glycol (meth)acrylates having a C2 to C4 alkylene group are preferred, and hydroxyethyl (meth)acrylate is particularly preferred.

Examples of the epoxy-group-containing ethylenically unsaturated monomer (b) include glycidyl (meth)acrylate, allyl glycidyl ether and methyl glycidyl (meth)acrylate, which may be used either alone or in combination. Among these monomers, glycidyl (meth)acrylate is particularly preferred.

Examples of the methylol-group-containing ethylenically unsaturated monomer (c) include N-methylol (meth)acrylamide and dimethylol (meth)acrylamide, which may be used either alone or in combination.

Examples of the alkoxyalkyl-group-containing ethylenically unsaturated monomer (d) include N-methoxymethyl (meth)acrylamide, N-butoxymethyl (meth)acrylamide, alkoxyalkyl (meth)acrylates such as methoxyethyl (meth)acrylate, methoxypropyl (meth)acrylate, ethoxyethyl (meth)acrylate and ethoxypropyl (meth)acrylate, and polyalkylene glycol monoalkoxy (meth)acrylates such as polyethylene glycol monomethoxy (meth)acrylate, which may be used either alone or in combination.

Examples of the cyano-group-containing ethylenically unsaturated monomer (e) include (meth)acrylonitrile.

Examples of the ethylenically unsaturated monomer (f) having two or more radically polymerizable double bonds include divinylbenzene, di(meth)acrylates such as polyoxyethylene di(meth)acrylate, polyoxypropylene di(meth)acrylate, neopentyl glycol di(meth)acrylate and butanediol di(meth)acrylate, tri(meth)acrylates such as trimethylolpropane tri(meth)acrylate, and tetra(meth)acrylates such as pentaerythritol tetra(meth)acrylate, which may be used either alone or in combination.

Examples of the amino-group-containing ethylenically unsaturated monomer (g) include N,N-dimethylaminoethyl (meth)acrylate and N,N-diethylaminoethyl (meth)acrylate, which may be used either alone or in combination.

Examples of the aromatic-ring-containing ethylenically unsaturated monomer (h) include styrene, α-methylstyrene, benzyl (meth)acrylate and phenoxyethyl (meth)acrylate, which may be used either alone or in combination.

Where the monomer (1c) is used in addition to the monomers (1a) and (1b), the monomer (1c) is preferably contained in the monomer component (I) in a proportion of 0 to 10 wt %, particularly preferably 0 to 5 wt %, based on the overall weight of the monomer component (I). If the proportion of the monomer (1c) other than the monomers (1a) and (1b) is excessively great, an ink coating film formed from the resulting aqueous inkjet ink composition tends to have poorer water resistance.

In the subsequent second polymerization stage, a monomer component (II) including the acid-group-containing monomer (2a) and a (meth)acrylate monomer (2b) as a major component thereof is added to the polymer obtained in the first stage for further polymerization.

Examples of the acid-group-containing monomer (2a) include those for the acid-group-containing monomer (1a). Among the acid-group-containing monomers, the carboxyl-group-containing monomers excellent in viscosity increasing effect are preferred, and (meth)acrylic acid is particularly preferred. Methacrylic acid is more preferred.

In the monomer component (II), the acid-group-containing monomer (2a) is preferably contained in a proportion of 20 to 80 wt %, particularly preferred 30 to 70 wt %, more preferably 40 to 60 wt %.

If the proportion of the acid-group-containing monomer (2a) is excessively great, an ink coating film formed from the resulting aqueous inkjet ink composition tends to be poorer in physical properties (ethanol resistance and water resistance. If the proportion of the acid-group-containing monomer (2a) is excessively small, it will be difficult to sufficiently provide the viscosity increasing effect.

Examples of the (meth)acrylate monomer (2b) include those for the (meth)acrylate monomer (1b). Among the (meth)acrylate monomers, methyl (meth)acrylate and n-butyl acrylate are preferred because an ink coating film formed from the resulting aqueous inkjet ink composition is excellent in physical properties (ethanol resistance and water resistance), and methyl (meth)acrylate is particularly preferred. Methyl acrylate is more preferred.

In the monomer component (II), the (meth)acrylate monomer (2b) is preferably contained in a proportion of 20 to 80 wt %, particularly preferably 30 to 70 wt %, more preferably 40 to 60 wt %.

If the proportion of the (meth)acrylate monomer (2b) is excessively great, it will be difficult to provide the viscosity increasing effect. If the proportion of the (meth)acrylate monomer (2b) is excessively small, an ink coating film formed from the resulting inkjet ink composition tends to be poorer in physical properties (ethanol resistance and water resistance).

As required, an additional monomer (2c) other than the acid-group-containing monomer (2a) and the (meth)acrylate monomer (2b) may be used, and examples of the monomer (2c) include those for the additional monomer (1c).

Where the monomer (2c) is used in addition to the monomers (2a) and (2b), the monomer (2c) is preferably contained in the monomer component (II) in a proportion of 0 to 10 wt %, particularly preferably 0 to 5 wt %, based on the overall weight of the monomer component (II). If the proportion of the monomer (2c) other than the monomers (2a) and (2b) is excessively great, the coating film tends to have poorer water resistance.

The acrylic resin emulsion is prepared by the polymerization of the respective monomer components (I) and (II). First, the acrylic resin emulsion will be described.

In addition to the monomer components (I) and (II), a surfactant is preferably used for the preparation of the acrylic resin emulsion. As required, additives such as a polymerization initiator, a polymerization controlling agent, a plasticizer and a film formation assisting agent may be used.

A generally known surfactant may be used as the surfactant. Examples of the surfactant include anionic, cationic and nonionic reactive surfactants, and anionic, cationic and nonionic nonreactive surfactants.

Among these surfactants, the anionic reactive surfactant, the anionic nonreactive surfactant and the nonionic nonreactive surfactant are preferably used, because these surfactants are excellent in polymerization stability and temporal stability.

Where the nonreactive surfactants are used, it is preferred to use the anionic nonreactive surfactant and the nonionic nonreactive surfactant in combination to ensure excellent temporal stability.

The anionic reactive surfactant is not particularly limited, as long as it is anionic and reactive. Examples of the anionic reactive surfactant include surfactants having structures represented by the following general formulae (1) to (11):

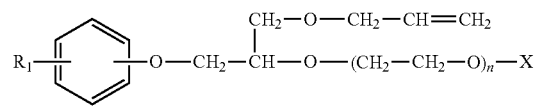

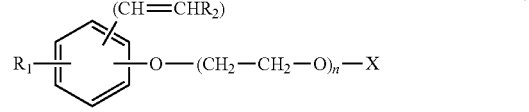

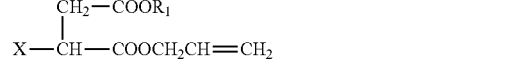

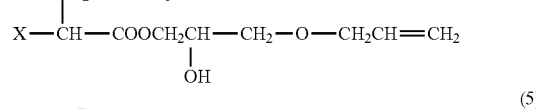

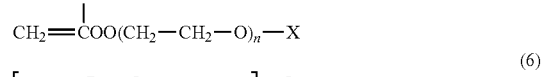

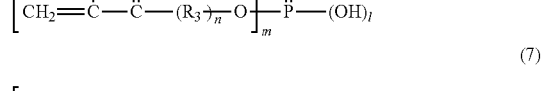

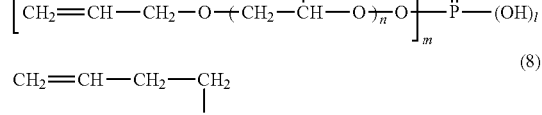

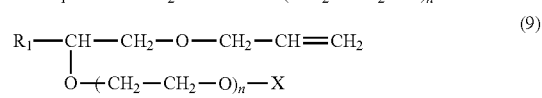

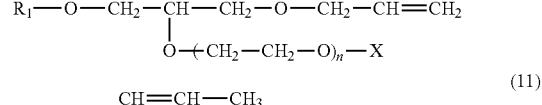

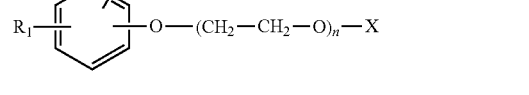

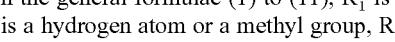

In the general formulae (1) to (11), $R_1$ is an alkyl group, $R_2$ is a hydrogen atom or a methyl group, $R_3$ is an alkylene group, n is an integer of not less than 1, m and l are integers not less than 1 and satisfy a relationship of m+l=3, and X is $SO_3NH_4$ or $SO_3Na$.

Specifically, examples of commercially available products of the anionic reactive surfactant include ADEKA REASOAP SE-20N, ADEKA REASOAP SE-10N, ADEKA REASOAP PP-70, ADEKA REASOAP PP-710, ADEKA REASOAP SR-10 and ADEKA REASOAP SR-20 (available from Adeka Corporation), ELEMINOL JS-2 and ELEMINOL RS-30 (available from Sanyo Chemical Industries Ltd.), RAMTEL S-180A, RAMTEL S-180 and RAMTEL PD-104 (available from Kao Corporation), AQUARON BC-05, AQUARON BC-10, AQUARON BC-20, AQUARON HS-05, AQUARON HS-10, AQUARON HS-20, NEW FRONTIER S-510, AQUARON KH-05 and AQUARON KH-10 (available from Dai-Ichi Kogyo Seiyaku Co., Ltd.), and PHOSPHINOL TX (available from Toho Chemical Industry Co., Ltd.)

Among the anionic reactive surfactants described above, anionic reactive emulsifiers having structures represented by the above general formulae (3), (4), (5), (9) and (10), i.e., having no alkylphenol structure, are preferred because they properly react with acryl and improve the stability of the emulsion. Specifically, ADEKA REASOAP SR-10, ADEKA REASOAP SR-20, ELEMINOL JS-2, ELEMINOL RS-30, RAMTEL S-180A, RAMTEL S-180, RAMTEL PD-104, AQUARON KH-05 and AQUARON KH-10 are preferred, and AQUARON KH-10 and RAMTEL PD-104 are more preferred.

Examples of the anionic nonreactive surfactant include alkyl sulfates, alkylbenzene sulfonates, alkyl sulfosuccinates, alkyl diphenyl ether disulfonates, polyoxyethylene alkyl sulfates and polyoxyethylene alkyl phosphates.

Examples of the nonionic nonreactive surfactant include polyoxyethylene alkyl ethers, polyoxyethylene alkyl phenyl ethers, oxyethylene-oxypropylene block polymers, sorbitan fatty acid esters and polyoxyethylene fatty acids.

Examples of the nonionic reactive surfactant include surfactants represented by the above general formulae (1) to (11) wherein X is a hydrogen atom. Specifically, examples of commercially available products of the nonionic reactive surfactant include ADEKA REASOAP NE-10, ADEKA REASOAP NE-20, ADEKA REASOAP NE-30, ADEKA REASOAP NE-40, ADEKA REASOAP ER-10, ADEKA REASOAP ER-20, ADEKA REASOAP ER-30 and ADEKA REASOAP ER-40 (commercially available from Adeka Corporation), and AQUARON RN-10, AQUARON RN-20, AQUARON RN-30 and AQUARON RN-50 (commercially available from Dai-Ichi Kogyo Seiyaku Co., Ltd.)

The surfactant may be blended with an emulsified monomer liquid including a mixture of the monomers, or may be preliminarily added to a polymerization can in which the monomer component is polymerized. Alternatively, these methods may be used in combination. The surfactant may be directly blended, or may be blended after being dissolved in a solvent or in the monomer component. Further, the surfactant may be added to the polymerization can at any of the polymerization stages, or may be added little by little to the polymerization can a plurality of times.

The surfactant is preferably used in an amount of 0.1 to 10 parts by weight, particularly preferably 3 to 5 parts by weight, based on 100 parts by weight of the overall monomer components (I) and (II).

If the amount of the surfactant is excessively small, the polymerization stability is liable to be reduced. If the amount of the surfactant is excessively great, the resulting coating film tends to have poorer physical properties.

A water-soluble or an oil-soluble polymerization initiator may be used as the polymerization initiator. Examples of the polymerization initiator include organic peroxides such as alkyl peroxides, t-butyl hydroperoxide, cumene hydroperoxide, p-methane hydroperoxide, lauroyl peroxide, 3,5,5-trimethyl hexanoyl peroxide, octanoyl peroxide, t-butyl cumyl peroxide, benzoyl peroxide, dichlorobenzoyl peroxide, dicumyl peroxide, di-t-butyl peroxide, 1,1-bis(t-butylperoxy)-3,3,5-trimethylcyclohexane, 3,3,5-trimethylcyclohexanone peroxide, methylcyclohexanone peroxide, diisobutyl peroxydicarbonate, di-2-ethylhexyl peroxydicarbonate and t-butyl peroxyisobutyrate; 2,2'-azobisisobutyronitrile, dimethyl-2,2'-azobisisobutyrate, 2,2'-azobis(2,4-dimethylvaleronitrile), 2,2'-azobis(2-methylbutyronitrile), potassium persulfate, sodium persulfate, ammonium persulfate, hydrogen peroxide, ammonium (amine) salts of 4,4'-azobis-4-cyanovaleric acid, 2,2'-azobis(2-methylamidoxime)dihydrochloride, 2,2'-azobis(2-methylbutaneamidoxime)dihydrochloride tetrahydrate, 2,2'-azobis{2-methyl-N-[1,1-bis(hydroxymethyl)-2-hydroxyethyl]-propionamide}, 2,2'-azobis[2-methyl-N-(2-hydroxyethyl)-propionamide], and various redox catalysts (including oxidizing agents such as ammonium persulfate, potassium persulfate, sodium persulfate, hydrogen peroxide, t-butyl hydroperoxide, benzoyl peroxide, cumene hydroperoxide and p-methane hydroperoxide, and reducing agents such as sodium sulfite, acidic sodium sulfite, Rongalite and ascorbic acid).

These polymerization initiators may be used either alone or in combination. Among these polymerization initiators, potassium persulfate, sodium persulfate, the redox catalysts (oxidizing agents such as potassium persulfate and sodium persulfate, and reducing agents such as sodium sulfite, acidic sodium sulfite, Rongalite and ascorbic acid) and the like are preferred because of their excellent polymerization stability.

The polymerization initiator is preferably used in an amount of 0.01 to 5 parts by weight, particularly preferably 0.03 to 3 parts by weight, more preferably 0.02 to 1 part by weight, based on 100 parts by weight of the overall monomer components (I) and (II). If the use amount of the polymerization initiator is excessively small, the polymerization speed tends to be lower. If the use amount of the polymerization initiator is excessively great, the resulting polymer tends to have a lower molecular weight and, hence, have poorer water resistance.

The polymerization initiator may be preliminarily added to the polymerization can, or may be added to the polymerization can immediately before the start of the polymerization and, as required, during the polymerization. Alternatively, the polymerization initiator may be preliminarily blended with the monomer component (I) or may be blended with an emulsion of the monomer component (I). The polymerization initiator may be added after being dissolved in a solvent or in the monomer component (I), or may be blended after the dissolved polymerization initiator is further emulsified.

Examples of the polymerization controlling agent include a chain transfer agent and a pH buffer agent.

Examples of the chain transfer agent include alcohols such as methanol, ethanol, propanol and butanol, aldehydes such as acetaldehyde, propionaldehyde, n-butyl aldehyde, furfural and benzaldehyde, and mercaptans such as n-dodecylmercaptan, thioglycolic acid, octyl thioglycolate and thioglycerol, which may be used either alone or in combination.

The use of the chain transfer agent is effective for stable polymerization, but reduces the polymerization degree of the acrylic resin and the elastic modulus of the resulting coating film. Specifically, therefore, the chain transfer agent is preferably used in an amount of 0.01 to 1 part by weight, particularly preferably 0.01 to 0.5 parts by weight, based on 100 parts by weight of the overall monomer components (I) and (II). If the use amount of the chain transfer agent is excessively small, the effect of the chain transfer agent tends to be insufficient. If the use amount of the chain transfer agent is excessively great, the resulting coating film tends to have a reduced elastic modulus.

Examples of the pH buffer agent include soda ash (sodium carbonate), sodium hydrogen carbonate, potassium hydrogen carbonate, monosodium phosphate, monopotassium phosphate, di sodium phosphate, tri sodium phosphate, sodium acetate, ammonium acetate, sodium formate and ammonium formate, which may be used either alone or in combination.

The pH buffer agent is used in an amount of 0.01 to 10 parts by weight, particularly preferably 0.1 to 5 parts by weight, based on 100 parts by weight of the overall monomer components (I) and (II). If the use amount of the pH buffer agent is excessively small, the polymerization controlling effect tends to be reduced. If the use amount of the pH buffer agent is excessively great, the reaction is liable to be inhibited.

Examples of the plasticizer include an adipate plasticizer, a phthalic acid plasticizer and a phosphoric acid plasticizer. The film formation assisting agent preferably has a boiling point of, for example, not lower than 260° C.

The use amounts of the plasticizer and the film formation assisting agent may be properly selected, as long as the object of the present invention is not impaired. For example, the plasticizer is typically used in an amount of 0.1 to 50 parts by weight based on 100 parts by weight of the overall monomer components (I) and (II). The film formation assisting agent is typically used in an amount of 0.1 to 50 parts by weight based on 100 parts by weight of the overall monomer components (I) and (II).

The acrylic resin emulsion includes the acrylic resin as a dispersoid. A dispersion medium is preferably such that the acrylic resin can be properly dispersed as the dispersoid therein. The dispersion medium is more preferably an aqueous medium. The term "aqueous medium" herein means water or an aqueous medium containing water as a major component and an alcohol solvent. The aqueous medium is preferably water.

The polymerization method for the acrylic resin emulsion is preferably such that the first emulsion is prepared by the emulsion polymerization of the monomer component (I), and then the monomer component (II) is added to the first emulsion and polymerized in the first emulsion through emulsion polymerization. This method is preferred for excellent viscosity increasing effect.

Exemplary methods for the emulsion polymerization of the monomer component (I) include a monomer dripping emulsion polymerization method in which water and the surfactant are put in a reaction can and the monomer component (I) and the polymerization initiator are added dropwise to the reaction can with heating, and an emulsified monomer dripping emulsion polymerization method in which a monomer mixture of the monomer component (I) to be added dropwise is preliminarily dispersed and emulsified in water with the use of the surfactant and then the dispersed and emulsified monomer is added dropwise to the reaction can. The emulsified monomer dripping emulsion polymerization method is preferred because conditions for the polymerization process (polymerization temperature and the like) can be easily managed and controlled.

The emulsified monomer dripping emulsion polymerization method includes, for example, the steps of putting water and, as required, the surfactant in the reaction can and heating the resulting mixture (typically to 40° C. to 90° C.), adding a part (typically 1 to 50 wt %) of the monomer component (I) emulsified and dispersed in water with the use of the surfactant and the polymerization initiator to the reaction can for initial polymerization (typically for a reaction period of 0.1 to 3 hours), adding the rest of the monomer component (I) collectively or dropwise to the reaction can and, as required, adding the polymerization initiator for the polymerization.

The polymerization of the monomer component (I) is allowed to proceed typically for 0.5 to 2 hours (preferably 0.5 to 1 hour) after completion of the addition of the entire amount of the monomer component (I), and completed when the polymerization percentage of the monomer component (I) becomes higher than 90% (preferably 95% or higher). Thus, the first emulsion is considered to be obtained. This is followed by further emulsion polymerization of the monomer component (II).

The polymerization percentage is calculated as the ratio of the actually measured amount of a nonvolatile component to the amount of the nonvolatile component calculated based on the formulations of the monomer components.

[Actually Measured Amount of Nonvolatile Component]

A predetermined amount of the emulsion is put in a container, and the weight of the nonvolatile component remaining after the emulsion is dried in an oven heated to 105° C. for 1 hour is measured.

The emulsion polymerization of the monomer component (II) is preferably allowed to proceed by adding the monomer component (II) into the first emulsion, i.e., into the reaction can in which the polymerization of the monomer component (I) is completed.

For the emulsion polymerization of the monomer component (II), the whole amount of the monomer component (II) may be collectively or dividedly added to the reaction can typically at 40° C. to 90° C. (preferably 60° C. to 85° C.) in 0.1 to 3 hours (preferably 0.5 to 2 hours).

Thus, the acrylic resin emulsion is prepared by the two stage polymerization method.

Where the acrylic resin emulsion is prepared by a three or more stage polymerization method (n=3 or greater), the final polymerization stage employs a monomer component containing the acid-group-containing monomer in a greater proportion than the other polymerization stages for the polymerization as in the two stage polymerization method in order to achieve the intended object of the present invention.

Thus, the inventive acrylic resin emulsion which includes the acrylic resin emulsion prepared in the aforementioned manner as a major component is provided for the aqueous inkjet ink.

As required, additives such as an organic pigment, an inorganic pigment, water-soluble additives, a pH adjusting agent, a preservative agent, a defoaming agent and an antioxidant may be added to the inventive acrylic resin emulsion for the aqueous inkjet ink.

The acrylic resin of the acrylic resin emulsion for the aqueous inkjet ink preferably has a glass transition temperature (Tg) of 0° C. to 120° C., particularly preferably 30° C. to 100° C., more preferably 40° C. to 100° C.

If the glass transition temperature is excessively high, the film formability is liable to be reduced. If the glass transition temperature is excessively low, an ink coating film formed from the resulting aqueous inkjet ink composition tends to have poorer physical properties.

The glass transition temperature (Tg) may be measured at a temperature increasing rate of 10° C./minute (at the 2nd run) by means of a differential scanning calorimeter (DSC) in conformity with JIS K7121 (the method of measuring the glass transition temperature of a plastic). After the first run is performed to once heat a sample to higher than the glass transition temperature to impart the sample with a certain thermal history, the second run is performed to heat the sample again.

The acrylic resin emulsion for the aqueous inkjet ink preferably has a solid concentration of 20 to 50 wt %, particularly preferably 30 to 45 wt %.

If the solid concentration is excessively high, the polymerization stability tends to be reduced. If the solid concentration is excessively low, the design flexibility of the ink formulation is liable to be reduced.

The acrylic resin emulsion for the aqueous inkjet ink preferably has a viscosity of 10 to 100,000 mPa·s, particularly preferably 10 to 50,000 mPa·s, more preferably 10 to 10,000 mPa·s.

If the viscosity is excessively low, it will be impossible to provide a higher viscosity ink by blending the acrylic resin emulsion with an ink material. If the viscosity is excessively high, the working efficiency for the preparation of the ink tends to be reduced.

The viscosity is measured by means of a B-type viscometer.

<Aqueous Inkjet Ink Composition>

In the present invention, a pigment dispersion, a solvent, a wetting agent and the like are blended with the acrylic resin emulsion prepared in the aforementioned manner for the aqueous inkjet ink, and then the resulting mixture is treated with an alkali to provide a more advantageous aqueous inkjet ink composition.

Examples of the pigment dispersion include CAB-O-JET 200, CAB-O-JET 260M, CAB-O-JET 270Y, CAB-O-JET 400, CAB-O-JET 450C, CAB-O-JET 465M, CAB-O-JET 470Y, CAB-O-JET 480V, CAB-O-JET 554B and CAB-O-JET 740Y (trade names) available from Cabot Corporation. The pigment dispersion is typically used in an amount of 2 to 15 wt % based on the overall weight of the aqueous inkjet ink composition.

Examples of the solvent include ethylene glycol monoethyl ether, ethylene glycol monobutyl ether, diethylene glycol monobutyl ether, diethylene glycol monoethyl ether, triethylene glycol monobutyl ether, propylene glycol monopropyl ether, tripropylene glycol monomethyl ether, 2-pyrrolidone, N-methyl-2-pyrrolidone, cyclohexyl pyrrolidone, 1-chlorohexyl-2-pyrrolidone, oxazolidin-2-one and 1,3-dimethyl-2-imidazolidinone. The solvent is typically used in an amount of 5 to 50 wt % based on the overall weight of the aqueous inkjet ink composition.

Examples of the wetting agent include silicone-containing surfactants available under the trade names of POLYFLOW KL-245 and POLYFLOW KL-260 from Kyoeisha Chemical Co., Ltd., and fluorine-containing surfactants available under the trade names of PHTHAGENT 100C and PHTHAGENT 150CH from Neos Co., Ltd. The wetting agent is typically used in an amount of 0.01 to 1 wt % based on the overall weight of the aqueous inkjet ink composition.

An exemplary preferred method for blending the pigment dispersion, the solvent, the wetting agent and the like with the acrylic resin emulsion is to respectively dilute these components (the pigment dispersion, the solvent, the wetting agent and the like) with water, and add the resulting solutions to the acrylic resin emulsion with stirring.

Examples of the alkali to be used for the alkali treatment include alkali-metal-containing bases such as sodium hydroxide, and amines such as ammonia and alkanolamines, among which the amines are preferred and ammonia is particularly preferred because an ink coating film formed from the resulting aqueous inkjet ink composition is excellent in physical properties.

An exemplary preferred method for the alkali treatment is to add a 5 to 10% ammonia aqueous solution to the acrylic resin emulsion with stirring. After the completion of the addition, the resulting mixture is continuously stirred for several minutes to several hours for completion of neutralization.

The proportion (solid proportion) of the acrylic resin emulsion to be blended for the aqueous inkjet ink is typically 1 to 20 wt % based on the overall weight of the aqueous inkjet ink composition.

The aqueous inkjet ink composition is usable as an aqueous inkjet ink, which is applied to a substrate by a generally known inkjet printing method.

Examples of the substrate include non-absorptive substrates such as polyvinyl chloride substrates and polyethylene terephthalate (PET) substrates, and absorptive substrates such as paper substrates, among which the non-absorptive substrates are preferred and the polyvinyl chloride substrates are particularly preferred.

The inventive acrylic resin emulsion for the aqueous inkjet ink is useful for the aqueous inkjet ink composition for use with a higher-viscosity ink printer head.

EXAMPLES

The present invention will hereinafter be described more specifically by way of examples thereof. It will be understood that the invention be not limited to these examples within the scope of the present invention.

Percentages and parts shown in the following examples are on a weight basis.

The following average particle diameters were measured in the aforementioned manner.

Example 1

Preparation of Acrylic Resin Emulsion (E1) for Aqueous Inkjet Ink

A monomer component (I) including 95 parts of methyl methacrylate and 5 parts of butyl acrylate was added to an aqueous solution prepared by dissolving 3.5 parts of a nonreactive surfactant (containing 2 parts of a nonionic nonreactive surfactant available under the trade name of EMULGEN 1135S-70 from Kao Corporation and 1.5 parts of an anionic nonreactive surfactant available under the trade name of EMULSOGEN EPA073 from Clarian GmbH) in 40 parts of water, and the resulting mixture was stirred, whereby an emulsified monomer composition was prepared.

Then, 173 parts of water and 1 part of a nonreactive surfactant (an anionic nonreactive surfactant available under the trade name of EMULSOGEN EPA073 from Clarian GmbH) were put in a glass reaction vessel provided with a thermometer, a stirrer, a reflux condenser, a nitrogen inlet tube and a dripping funnel, and the surfactant was dissolved in the water with stirring. The resulting mixture was heated up to 73° C. Then, 5% of the aforementioned emulsified monomer composition was added to the mixture. In turn, the resulting mixture was stirred, and 1.3 parts of 3% potassium persulfate was added to the mixture for initial polymerization. Thereafter, 5.3 parts of 3% potassium persulfate and the rest of the emulsified monomer composition were added dropwise to the resulting mixture in 3 hours and 30 minutes for a polymerization reaction while the mixture was kept at a temperature of 80° C. After completion of the dropwise addition, the reaction was allowed to proceed for 60 minutes. Thus, the first polymerization stage was completed.

Then, a monomer component (II) including 2.8 parts of methyl methacrylate and 2.4 parts of methacrylic acid, and 0.87 parts of 3% potassium persulfate were simultaneously added to the resulting polymerization product, whereby the second polymerization stage was started. After the dropwise addition, the pH of the resulting product was adjusted to pH6 with a 5% ammonia aqueous solution, and then the reaction was allowed to completely proceed for 1 hour. Thereafter, the resulting product was cooled to 50° C., and continuously stirred for 1 hour. After the resulting product was cooled to a room temperature, 0.5 parts of a preservative agent (available under the trade name of ACTICIDE MBS from Thor Japan Inc.) was added to the resulting product. Thus, a milky-white acrylic resin emulsion (E1) for an aqueous inkjet ink (having a solid concentration of 30%, an average particle diameter of 70 nm, a resin acid value of 14 mgKOH/g and a glass transition temperature of 95° C.) was prepared.

Comparative Example 1

Preparation of Acrylic Resin Emulsion (E1') for Aqueous Inkjet Ink

A monomer component including 85 parts of methyl methacrylate, 15 parts of butyl acrylate and 2.2 parts of methacrylic acid was added to an aqueous solution prepared by dissolving 3 parts of a reactive surfactant (containing 1 part of an anionic reactive surfactant available under the trade name of ADEKA REASOAP SR-10 from ADEKA Corporation and 2 parts of an anionic reactive surfactant available under the trade name of AQUARON KH-10 from Dai-Ichi Kogyo Seiyaku Co., Ltd.) in 36 parts of water, and the resulting mixture was stirred, whereby an emulsified monomer composition was prepared.

Then, 80 parts of water and 1 part of a reactive surfactant (available under the trade name of ADEKA REASOAP SR-10 from ADEKA Corporation) were put in a glass reaction vessel provided with a thermometer, a stirrer, a reflux condenser, a nitrogen inlet tube and a dripping funnel, and the surfactant was dissolved in the water with stirring. The resulting mixture was heated up to 73° C. Then, 5% of the aforementioned emulsified monomer composition was added to the mixture. In turn, the resulting mixture was stirred, and 2.2 parts of 3% potassium persulfate was added to the mixture for initial polymerization. Thereafter, 4.4 parts of 3% potassium persulfate and the rest of the emulsified monomer composition were added dropwise to the resulting mixture in 4 hours for a polymerization reaction while the mixture was kept at a temperature of 80° C. After completion of the dropwise addition, the pH of the resulting product was adjusted to pH6 with a 10% ammonia aqueous solution, and then the reaction was allowed to completely proceed for 1 hour.

Thereafter, the resulting product was cooled to 50° C., and continuously stirred for 1 hour. After the resulting product was cooled to a room temperature, 0.5 parts of a preservative agent (available under the trade name of NIPACIDE BIT20 from Clarian GmbH) was added to the resulting product. Thus, a milky-white acrylic resin emulsion (E1') for an aqueous inkjet ink (having a solid concentration of 41%, an average particle diameter of 105 nm, a resin acid value of 12 mgKOH/g and a glass transition temperature of 80° C.) was prepared.

The acrylic resin emulsions of Example 1 and Comparative Example 1 for the aqueous inkjet inks were analyzed in the following manner.

<Measurement of NMR Spectrum>

NMR spectra (for (As) and (At)) were measured at a temperature of 20° C. by means of an NMR spectrometer (AVANCE III 400WB available from Bruker Corporation) with the use of a 4-mm diameter solid CP/MAS probe and a 4-mm HRMAS test tube under measurement conditions shown below in Table 2.

TABLE 2

|  | (As) measuring conditions | (At) measuring conditions |
|---|---|---|
| Revolutions of test tube | 10000 Hz | |
| Major measurement parameters | | |
| $^1$H 90° pulse | 4 μs × 3 dB (39 W/300 W) | |
| Contact time (corresponding to (i) in the FIGURE) | 1000 μs (Highly quantitative conditions are selected for contact time) | |
| Time required for demagnetization of solid component (corresponding to τt in the FIGURE) | 1 ms | — |
| $^1$H spin diffusion time (corresponding to τd in the FIGURE) | 5 ms | — |
| FID signal fetch time (corresponding to (ii) in the FIGURE) | 14 ms | 14 ms |
| Number of times of multiplication | >8000 | >256 |
| Observation center | 120 ppm | |
| Observation width | 365 ppm | |

<Method of Calculating Content Mole Ratio of Acid-Group-Containing Monomer>

The content mole ratios of the acid-group-containing monomer were each determined by dividing the spectrum obtained by the NMR measurement into a zone of 186.5 to 181.8 ppm and a zone of 181.8 to 171.8 ppm, calculating integration values (A) and (B) from area ratios, and substituting the integration values (A) and (B) into the following mathematical expression (MATH-2):

Integration value (A): CO of methacrylic acid (186.5 to 181.8 ppm)

Integration value (B): CO of methyl methacrylate and butyl acrylate (181.8 to 171.8 ppm)

$$\text{Content mole ratio (mol \%) of methacrylic acid} = 100 \times A/(A+B) \quad \text{(MATH-2)}$$

The mole ratios of the acid-group-containing monomer (methacrylic acid) in the acrylic resin emulsions (E1) and (E1') were calculated based on the NMR measurement by the method of calculating the content mole ratio of the acid-group-containing monomer. Thus, the content mole ratios (As) and (At) and the ratio (As)/(At) were calculated. The calculation results are shown below in Table 3.

TABLE 3

|  | Example 1 Emulsion (E1) | Comparative Example 1 Emulsion (E1') |
|---|---|---|
| Resin acid value (mgKOH/g) | 14 | 12 |
| (As) (mol %) for surface layer (5 ms) | 36.6 | 19.7 |
| (At) (mol %) for overall | 2.5 | 2.6 |
| (As)/(At) | 14.6 | 7.6 |

Then, aqueous inkjet ink compositions were respectively produced by using the acrylic resin emulsions (E1) and (E1') prepared in the aforementioned manner.

<Production of Aqueous Inkjet Ink Composition (C1)>

After 10 parts of 2-pyrrolidone and 10 parts of propylene glycol monopropyl ether (film formation assisting agent), 0.5 parts of a wetting agent (WET260 available from Evonik Tego Chemie GmbH) and 70.5 parts of water were blended with 9 parts (solid proportion) of the acrylic resin emulsion (E1) prepared in Example 1 for the aqueous inkjet ink with stirring, the pH of the resulting mixture was adjusted to pH7.8 with the use of a 10% ammonia aqueous solution. Thus, an aqueous inkjet ink composition (C1) was produced.

<Production of Aqueous Inkjet Ink Composition (C1')>

After 10 parts of 2-pyrrolidone and 10 parts of propylene glycol monopropyl ether (film formation assisting agent), 0.5 parts of a wetting agent (WET260 available from Evonik Tego Chemie GmbH) and 70.5 parts of water were blended with 9 parts (solid proportion) of the acrylic resin emulsion (E1') prepared in Comparative Example 1 for the aqueous inkjet ink with stirring, the pH of the resulting mixture was adjusted to pH7.8 with the use of a 10% ammonia aqueous solution. Thus, an aqueous inkjet ink composition (C1') was produced.

<Evaluation for Viscosity>

The viscosities of the aqueous inkjet ink compositions (C1) and (C1') were measured (at 23° C. with a rotor No. 1 rotated at a rotation speed of 60 rpm) by means of a B-type viscometer (TVB10 available from Toki Sangyo Co., Ltd.) The measurement results are shown below in Table 4.

The proper viscosity of the aqueous inkjet ink composition is about 4 to about 30 mPa·s, and an aqueous inkjet ink composition having a viscosity of 10 mPa·s or higher is regarded as a higher viscosity aqueous inkjet ink composition. Since the viscosity of the aqueous inkjet ink composition (C1') produced in the aforementioned manner fell outside the proper viscosity range, it was impossible to properly apply the aqueous inkjet ink composition (C1') by means of a bar coater. Therefore, a tackifier was blended with the aqueous inkjet ink composition (C1') so as to impart the aqueous inkjet ink composition (C1') with a proper viscosity.

<Production of Aqueous Inkjet Ink Composition (C2')>

An aqueous inkjet ink composition (C2') having the same viscosity as the aqueous inkjet ink composition (C1) was produced by blending a tackifier (BISMOL YK-1 available from Toho Chemical Co., Ltd.) with the aqueous inkjet ink composition (C1') in an amount of 10 wt % based on the overall weight of the aqueous inkjet ink composition (C1').

The aqueous inkjet ink compositions (C1) and (C2') produced in the aforementioned manner were evaluated for glossiness in the following manner.

<Evaluation for Glossiness>

The aqueous inkjet ink compositions (C1) and (C2') were each applied onto a polyvinyl chloride (PVC) sheet (MD5 available from Metamark Inc.) by means of a bar coater No. 4 (to a wet thickness of 9.1 μm (micrometer)). Thereafter, the resulting sheet was kept in an oven at 100° C. for 20 minutes, whereby a film was formed and dried. Thus, a coating surface was provided.

The 20-degree glossiness and the 60-degree glossiness of the coating surface thus provided were measured by means of a glossiness meter (Micro-TRI-gloss 4520 available from BYK Gardner GmbH).

The evaluation was based on the following criteria, and the results are shown below in Table 4.

The PVC sheet (substrate sheet) had a 20-degree glossiness of 70 (Δ) and a 60-degree glossiness of 90 (○).
(Evaluation)
Excellent (○): A glossiness of not less than 80.
Acceptable (Δ): A glossiness of not less than 40 and less than 80.
Unacceptable (x): A glossiness of not less than 0 and less than 40.

TABLE 4

|  | Example 1 Emulsion (E1) | Comparative Example 1 Emulsion (E1') | |
| --- | --- | --- | --- |
|  | Aqueous inkjet ink composition (C1) | Aqueous inkjet ink composition (C1') | Aqueous inkjet ink composition (C2') |
| Viscosity | 18 mPa · s | 2.9 mPa · s | 18 mPa · s |
| Glossiness 20-degree glossiness | | | |
| Measured value | 62 | — | 33 |
| Evaluation | Δ | — | x |
| 60-degree glossiness | | | |
| Measured value | 90 | — | 70 |
| Evaluation | ○ | — | Δ |

As can be understood from the results shown in Table 4, the aqueous inkjet ink composition produced by using the acrylic resin emulsion (E1) of Example 1 for the aqueous inkjet ink had a higher viscosity and the inkjet ink produced from this composition had excellent glossiness. This is because the acrylic resin emulsion (E1) was prepared by using the monomer component containing the acid-group-containing monomer in a greater amount in the final polymerization stage than in the other polymerization stage and, therefore, the acrylic resin particles each had a higher acid value in a surface region thereof, and the higher-acid-value surface portions were dissolved to increase the interaction between the emulsion particles.

In contrast, the aqueous inkjet ink composition (C1') produced by using the acrylic resin emulsion (E1') of Comparative Example 1 for the aqueous inkjet ink had a lower viscosity and, even when the viscosity of the aqueous inkjet ink composition was increased by the addition of the tackifier, the resulting aqueous inkjet ink composition (C2') had poorer glossiness.

While specific forms of the embodiment of the present invention have been shown in the aforementioned inventive example, the inventive example is merely illustrative of the invention but not limitative of the invention. It is contemplated that various modifications apparent to those skilled in the art could be made within the scope of the invention.

The aqueous inkjet ink composition produced by using the inventive acrylic resin emulsion for the aqueous inkjet ink is imparted with a higher viscosity without the use of a tackifier and is excellent in glossiness and other ink properties. Therefore, the inventive acrylic resin emulsion is particularly useful for an aqueous inkjet ink composition for use with a higher-viscosity ink printer head.

What is claimed is:

1. An aqueous inkjet ink composition comprising:
an acrylic resin emulsion for an aqueous inkjet ink, comprising a particulate acrylic resin having an acid value of 1 to 100 mgKOH/g;
a pigment;
a solvent; and
a wetting agent,
wherein, in the acrylic resin emulsion for an aqueous inkjet ink, an acid-group-containing monomer is present at a content mole ratio (As) in surface regions of particles of the particulate acrylic resin and present at a content mole ratio (At) in the overall acrylic resin particles as measured with a $^1$H spin diffusion time of 5 ms, and a ratio (As/At) of the content mole ratio (As) to the content mole ratio (At) is not less than 9.

2. The aqueous inkjet ink composition according to claim 1, wherein the particulate acrylic resin has an average particle diameter of 40 to 300 nm.

3. The aqueous inkjet ink composition according to claim 1, which is prepared by an n-stage polymerization (wherein n is an integer of not less than 2), wherein the following weight ratios ($\alpha$) and ($\beta$) are satisfied:
- ($\alpha$) a weight ratio (1a)/(2a) between an acid-group-containing monomer (1a) to be used in the first to (n−1)th polymerization stages and an acid-group-containing monomer (2a) to be used in the n-th polymerization stage is (1a)/(2a)=0/100 to 40/60; and
- ($\beta$) a weight ratio (X1)/(X2) between a total weight (X1) of monomers to be used in the first to (n−1)th polymerization stages and a total weight (X2) of monomers to be used in the n-th polymerization stage is (X1)/(X2)=99/1 to 60/40.

4. An aqueous inkjet ink composition, which is prepared by treating the aqueous inkjet ink composition according to claim 1 with an alkali.

5. The aqueous inkjet ink composition according to claim 1, wherein the particulate acrylic resin has an acid value of 1 to 30 mgKOH/g.

\* \* \* \* \*